United States Patent [19]
Heinrich et al.

[11] Patent Number: 5,292,292
[45] Date of Patent: Mar. 8, 1994

[54] EPICYCLIC GEAR TRAIN PLANET CARRIER

[75] Inventors: Karl Heinrich, Wäldenweiler; Günter Kirsch, Stuttgart, both of Fed. Rep. of Germany

[73] Assignee: Mercedes-Benz AG, Fed. Rep. of Germany

[21] Appl. No.: 970,871

[22] Filed: Nov. 3, 1992

[30] Foreign Application Priority Data

Nov. 23, 1991 [DE] Fed. Rep. of Germany ....... 4138548

[51] Int. Cl.$^5$ .............................................. F16H 3/44
[52] U.S. Cl. ..................................... 475/331; 475/346
[58] Field of Search ................ 475/330, 331, 346, 901

[56] References Cited

U.S. PATENT DOCUMENTS

| 1,151,381 | 8/1915 | Olson | 475/331 |
| 1,820,061 | 8/1931 | Flagg | 475/331 X |
| 2,501,034 | 3/1950 | Derbyshire | 475/346 |
| 3,459,070 | 8/1969 | Holdeman | 475/346 X |
| 4,043,021 | 8/1977 | Mosbacher et al. | 475/331 X |
| 5,176,590 | 1/1993 | Haydock | 475/346 X |

FOREIGN PATENT DOCUMENTS

| 271416 | 6/1988 | European Pat. Off. | 475/331 |
| 2148937 | 4/1972 | Fed. Rep. of Germany. | |
| 2605230 | 7/1977 | Fed. Rep. of Germany | 475/331 |
| 53-134160 | 11/1978 | Japan | 475/331 |
| 58-156773 | 9/1983 | Japan | 475/331 |
| 59-126136 | 7/1984 | Japan | 475/331 |
| 59-212557 | 12/1984 | Japan | 475/331 |
| 60-84443 | 5/1985 | Japan | 475/331 |
| 1036981 | 8/1983 | U.S.S.R. | 475/331 |

OTHER PUBLICATIONS

Planetengetriebe in automatischen Fahrzeuggetrieben*, Jürgen Pickard, pp. 41–49, Automobil-Industrie Apr. 1979.

Primary Examiner—Leslie A. Braun
Assistant Examiner—Ryan W. Massey
Attorney, Agent, or Firm—Evenson, McKeown, Edwards & Lenahan

[57] ABSTRACT

A planet carrier, which, as a whole, is constructed as a one-piece sheet metal pressing, comprising a cage ring with one receiving bore respectively for one pin and respectively of mounting pins, at least one cage arm part with one receiving bore respectively for the respective other pin end, and connection means for a transmission member. Furthermore, the sheet metal pressing comprises at least one connecting arm between the cage ring and the cage arm parts having the connection means.

8 Claims, 3 Drawing Sheets

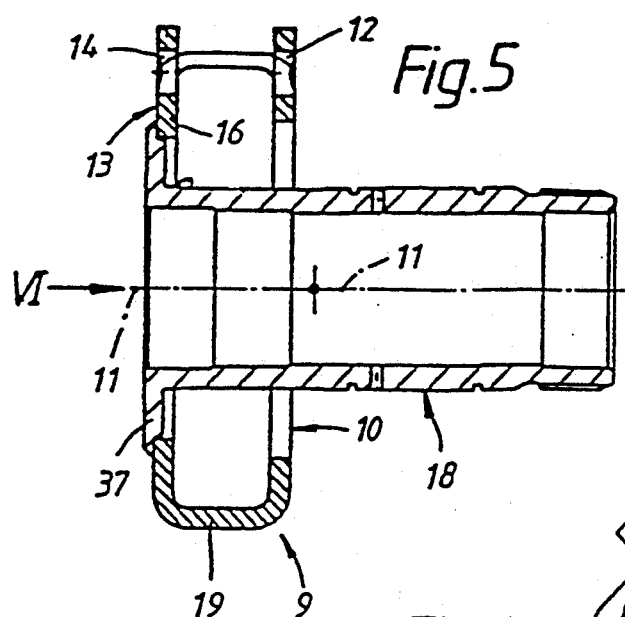
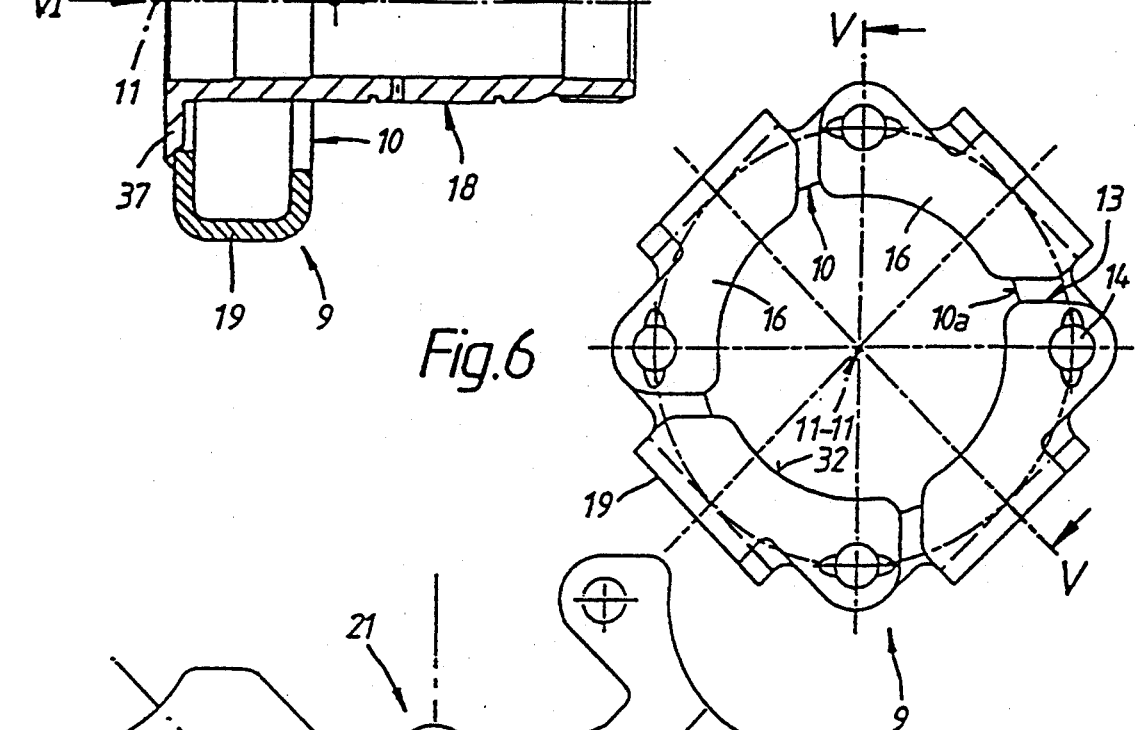
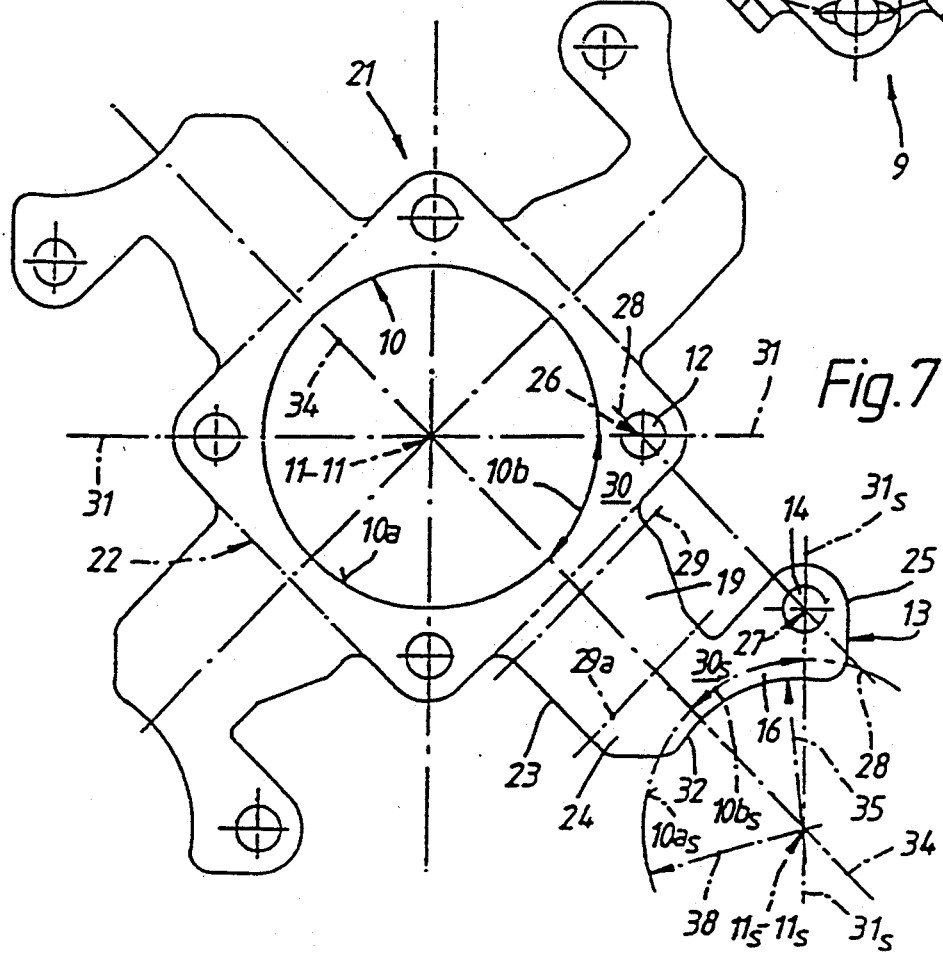

EPICYCLIC GEAR TRAIN PLANET CARRIER

BACKGROUND AND SUMMARY OF THE INVENTION

The present invention relates to a planet carrier, and a method of making a planet carrier, and, more particularly, to a planet carrier in an epicyclic gear train comprising a central free cage ring having mounting holes which are axially parallel to the cage ring axis for receiving one end respectively of mounting pins; cage arm parts, each of which has a mounting hole which is axially parallel to the cage ring axis for receiving the other end respectively of the mounting pins; connection structure joined for movement with the cage arm parts, for connecting the planet carrier to a transmission member concentric to the cage ring axis; and connecting arms, disposed axially parallel to the cage ring axis, for connecting the free cage ring for movement with the cage arm parts joined to the connection structure, wherein the free cage ring and the connecting arms are formed as a one-piece sheet metal pressing.

Planet carriers of the type shown, for example, in Automobil-Industrie 4/79, p. 46, FIG. 13 are well known and are, in particular, used in motor vehicle automatic transmissions. In these known planet carriers, a basket-like planet carrier part, which is produced by stamping from a sheet blank followed by deep-drawing, and which consists of the cage ring and the connecting cage arms, is connected, generally by welding, to a flange part which combines not only the cage arm parts provided with the mounting holes but also the connection for the transmission part and may as desired be produced by stamping, forging or sintering.

DE 21 48 937 A1 also shows a planet carrier, in which, in contrast to planet carriers made of cast or pressed steel, the ends of the shafts of the planet gears are supported by holes which lie opposite one another. The holes are provided, on one hand, in a circular flange and, on the other hand, in the bottom, parallel thereto, of a cover whose peripheral part is welded to the periphery of the flange and which has cut-outs for the passage of the teeth of the planet gears. The flange and its cover are made of deep-drawn sheet metal.

DE 26 05 230 B1 discloses a different type planet carrier which is in one piece and consists of two side discs and a plurality of cage arms connecting the latter together. The planet carrier is provided with machined holes disposed entirely within the inside diameter of the cage arms and with axial stop faces which are raised in relation to the plane surface surrounding them and which completely surround the holes, for mounting the planet gears. In order to be able to manufacture this planet carrier, including its stop faces, at low cost, the stop faces are machined throughout, e.g. by turning, to a finished diameter smaller than the inside diameter of the cage arms and larger than the largest diameter of the stop faces in the region free from arms.

An object underlying the present invention consists essentially in reducing the cost of manufacture of a planet carrier. This object has been advantageously achieved by providing that the one-piece sheet metal pressing comprises not only the cage arm parts but also the edge portions thereof constituting the connection structure.

The planet carrier according to the present invention is brought into the desired shape, in its entirety and in one piece, by stamping a shaped flat sheet metal blank from a sheet blank and then folding it twice. On one side of the cage a stiff, closed cage ring is formed and on the opposite side individual lobes are formed, which can be welded either by their inner edge portions to a transmission shaft or by their outer edge portions to a drum-shaped part of a center gear, so that as a whole a stiff composite construction is once again obtained and transmission of the torque is made possible.

BRIEF DESCRIPTION OF THE DRAWINGS

These and other objects, features and advantages of the present invention will become more apparent from the following detailed description of currently preferred embodiments when taken in conjunction with the accompanying drawings wherein:

FIG. 5 is a sectional view, containing the cage ring axis, along the line V—V in hereinbelow described FIG. 6 through a planet carrier according to a second embodiment of the present invention, in which the planet carrier is connected to a transmission shaft of an epicyclic gear train;

FIG. 6 is a side view along the direction of arrow VI in FIG. 5 but showing only the planet carrier of FIG. 5; and FIG. 7 is a layout view, developed into one plane, of the shaped sheet metal blank of the planet carrier shown in FIG. 5.

DETAILED DESCRIPTION OF THE DRAWINGS

Figure 1:
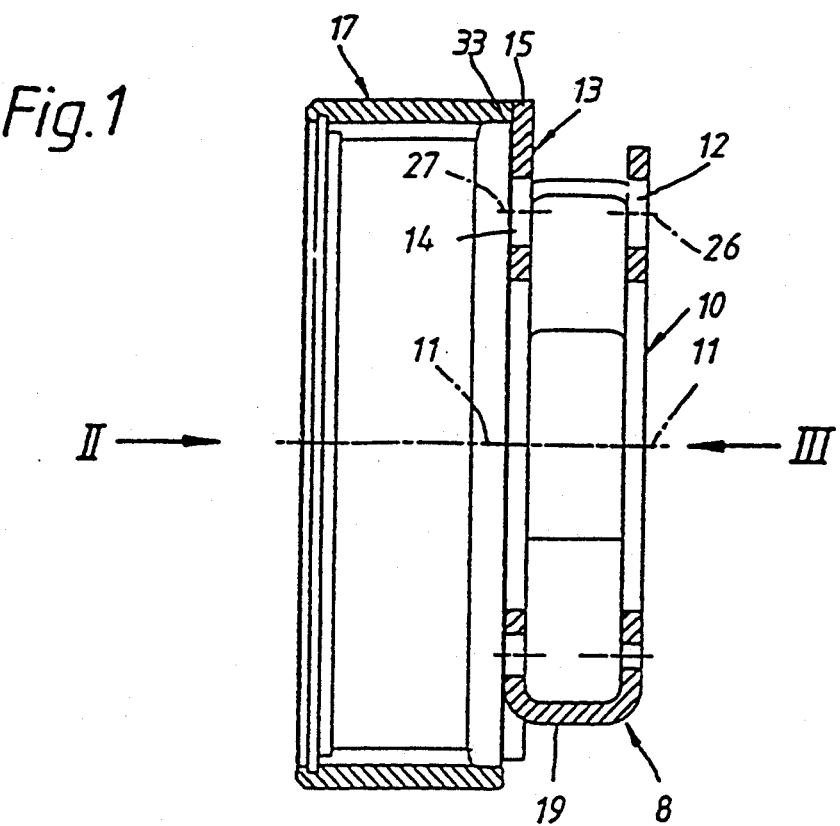
FIG. 1 is a sectional view, containing the cage ring axis, along the line I—I in hereinbelow described FIG. 2 through a planet carrier according to a first embodiment of the present invention in which the planet carrier is connected to an outer center gear of an epicyclic gear train.
Figure 2:
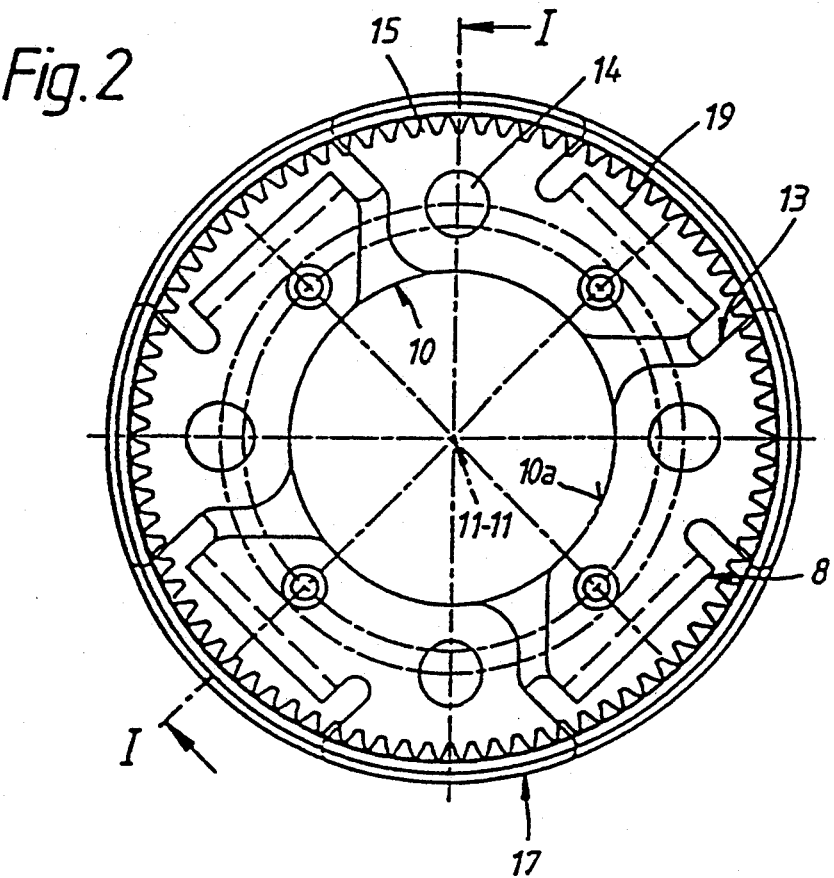
FIG. 2 is a side view along the direction of the arrow II in FIG. 1.
Figure 3:
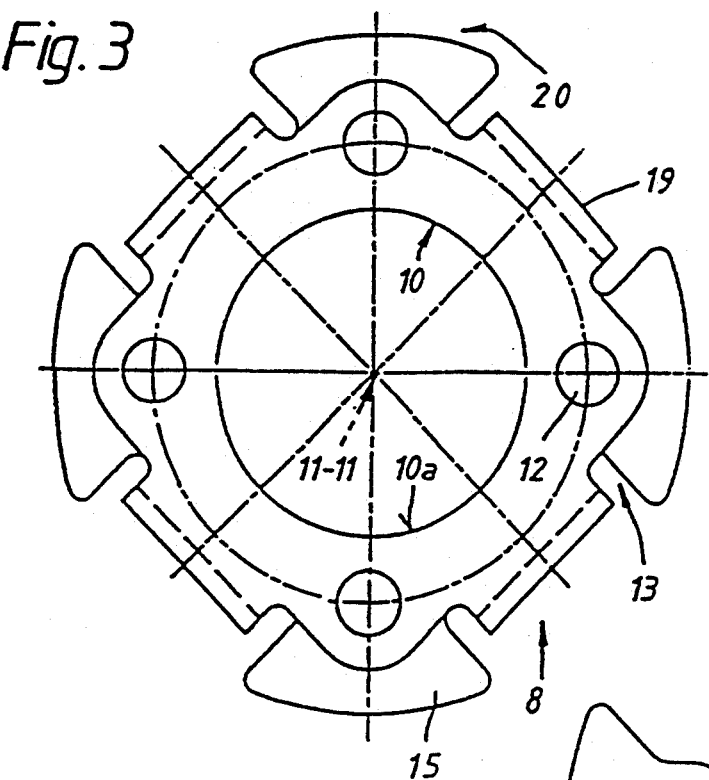
FIG. 3 is a side view along the direction of the arrow III in FIG. 1 but showing only the planet carrier of FIG. 1.

Referring to FIGS. 1 to 3, a first embodiment of the planet carrier according to the present invention is designated generally by the numeral 8 and used for connection for rotation with an outer center gear 17 of an epicyclic gear train. For this purpose, the center gear 17 has on one end face a concentric drum-like projection 33, on whose end face the respective edge portion 15 of four lobe-like cage arm parts 13 of the planet carrier 8 are joined by welding. The center axes of the planet carrier 8 and center gear 17 coincide in a cage ring axis 11—11. The cage arm parts 13 lying in a plane at right angles to the cage ring axis 11—11 are in each case connected by a respective connecting arm 19, which lies axially parallel to the cage ring axis 11—11, to a free cage ring 10, which likewise lies in a plane at right angles to the cage ring axis 11—11 and whose center axis forms the cage ring axis 11—11.

The cage ring 10 has four mounting holes 12 parallel to the cage ring axis 11—11 for one end respectively of four mounting pins (not shown) for mounting planet gears in a known manner. Each of the four cage arm parts 13 has a mounting hole 14 axially parallel to the cage ring axis 11—11 for the other end respectively of the mounting pins. The respective axes 26, 27 of two mounting holes 12, 14 associated with one mounting pin are in alignment with one another.

Figure 4:
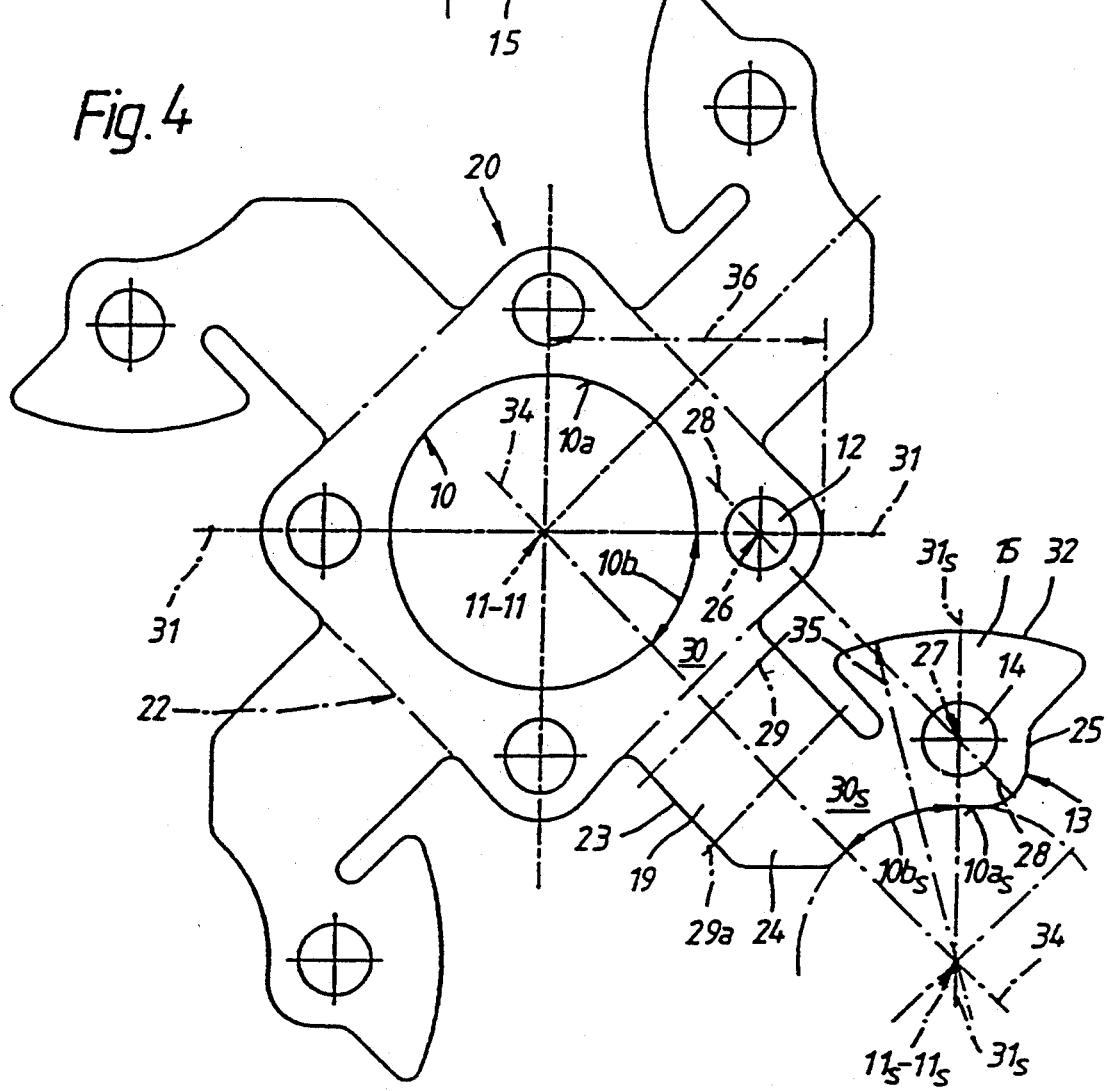
FIG. 4 is a lay-out view, developed into one plane, of the shaped sheet metal blank of the planet carrier shown in FIGS. 1 and 3.

The entire planet carrier 8 consists of a one-piece sheet metal pressing which is shown laid-out in FIG. 4 in the form of a shaped sheet metal blank 20 developed into the plane of the drawing. The shaped sheet metal blank 20 comprises a central portion 22, which has a substantially square outline and forms the cage ring 10 and its central opening 10a and which has the four diagonally disposed mounting holes 12. Four strip portions 23 extend from the central portion 22, each of which lies centrally to a plane 34—34 containing the cage ring axis 11—11 and centrally between two of the mounting holes 12.

The identically shaped strip portions 23 consist of a part which adjoins the central portion 22 and forms the connecting arm 19, and of an L-shaped extension which radially adjoins the part 19 and forms the cage arm 13. One leg 24 of the extension 13 is in alignment with the part 19, while the other leg 25 of the extension 13 extends transversely to the plane 34—34 and comprises both the mounting hole 14 and the edge portion 15.

The axis 27 of the mounting hole 14 of the extension 13 and the axis 26 of the appertaining mounting hole 12 in the central portion 22 lie in a plane 28—28 extending on a straight line 29 which constitutes the theoretical bend edge between the central portion 22 and the strip portion 23. A theoretical bend edge between that part of the strip portion 23 which forms the connecting arm 19, on one hand, and the leg 24 of the extension 13 on the other hand is indicated by a straight line 29a which is parallel to the straight line 29 and lies at a distance therefrom corresponding to the axial length of the connecting arm 19.

Accordingly, by bending the strip portion 23 relative to the central portion 22 about the bend edge 29 through an angle of 90 degrees, and by bending the extension 13 relative to the part 19 of the strip portion 23 about the bend edge through an angle of 90 degrees, the extension 13 can be brought into the final position parallel to the cage ring 10 and, at the same time, the respective axes 26, 27 of the two associated mounting holes 12, 14 can be brought into alignment with one another.

To ensure that the edge portion 15 will then assume a position radially outside the cage ring 17, the edge portion 15 in the shaped sheet metal blank 20, relative to the mirror-image cage ring axis $11_S$—$11_S$, is disposed radially outside in relation to the mounting hole 14.

The geometrical shape of the L-shaped extension 13 of the shaped sheet metal blank 20 is based on a portion $30_S$, mirrored about the straight line 29, which is identical to a portion 30 of the central portion 22. The portion 30 is bounded essentially by the plane 34—34, a plane at right angles to the plane 34—34 and containing the straight line 29, a plane 31—31 containing the cage ring axis 11—11 and the axis 26, by the contour of the mounting hole 12 and by the portion 10b, which has the shape of an arc of a circle and lies between the planes 31—31 and 34—34, of the central opening 10a of the central portion 22. The boundary of the mirrored portion $30_S$ is thus correspondingly determined by a plane which is at right angles to the plane 34—34 and contains the straight line 29a, by the plane 34—34, by the mirrored plane $31_S$—$31_S$ which contains the mirrored cage ring axis $11_S$—$11_S$ and the axis 27, by the portion $10b_S$, which has the shape of an arc of a circle and lies between the planes $31_S$—$31_S$ and 34—34, of the mirrored central opening $10a_S$ of the central portion 22, and by the contour of the mounting hole 14.

The geometrical shape of the edge portion 15 is determined by a cylindrical outer lateral area 32 which lies centrally in relation to the mirrored cage ring axis $11_S$—$11_S$ and has a radius 35 which is larger than the dimension 36 of a diagonal of the central portion 22. In addition, the geometrical shape of the edge portion 15 is symmetrical to the mirrored axis $31_S$—$31_S$. In this way the shape of the edge portion 15 is adapted to the circular ring shape of the drum-like extension 33 on the center gear 17.

In the embodiment illustrated in FIGS. 5 to 7, the planet carrier 9 is adapted for connection for rotation with a transmission shaft 18 in the form of a hollow shaft. For this purpose, the transmission shaft 18 has at one end a flange 37 to which the radially inward-pointing edge portions 16 of cage arm parts 13 of the planet carrier 9 are joined by welding such that the planet carrier 9 and the transmission shaft 18 are disposed centrally to a cage ring axis 11—11 and also form a single rigid composite part.

The planet carrier 9 also consists as a whole of a one-piece sheet metal pressing, for which the shaped sheet metal blank 21 is shown in FIG. 7, developed into one plane.

Except for the position and shape of the edge portions 15, 16 used as a connection structure for the respective transmission part, the shaped sheet metal blanks 20 and 21 are essentially identical in construction. Therefore, like features of the two shaped sheet metal blanks 20 and 21 are given the same reference numerals, so that in the explanation of the shaped sheet metal blank 21 reference can also be made to the description of the shaped sheet metal blank 20 in FIG. 4.

The different configuration of the edge portion 16 of the various connecting arms 13 is explained below with reference to FIG. 7. The edge portion 16 adjoins the mirrored portion $30_S$ in the radially inward direction, in relation to the mirrored cage ring axis $11_S$—$11_S$. The geometrical shape of the edge portion 16 is likewise bounded by a cylindrical lateral area 32, which lies centrally relative to the mirrored cage ring axis $11_S$—$11_S$ and has a radius 35 smaller than the radius 38 of the mirrored central opening $10a_S$. In the peripheral direction relative to the mirrored cage ring axis $11_S$—$11_S$ the edge portion 16 extends mainly between the planes 34—34 and $31_S$—$31_S$, but may also extend slightly further in the peripheral direction, in accordance with the arrangement illustrated. In other respects, however, the two planet carriers 8, 9 are completely identical both in construction and in how they are manufactured.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A planet carrier for an epicyclic gear train, comprising a central free cage ring having mounting holes arranged axially parallel to an axis of the cage ring and adapted to receive one end of respective mounting pins, cage arm parts, each having a mounting hole arranged axially parallel to the cage ring axis and adapted to receive the other end of the respective mounting pins, connection means joined for movement with the cage arm parts, for connecting the planet carrier to a transmission member concentric to the cage ring axis, and connecting arms arranged axially parallel to the cage ring axis for connecting the free cage ring for movement with the cage arm parts joined to the connection means, wherein the free cage ring and edge portions constituting the connection means are a one-piece sheet pressing.

2. The planet carrier according to claim 1, wherein the one-piece sheet metal pressing, as viewed in a planar development, comprises a blank formed of a central portion forming the free cage ring, and strip portions extending radially from the central portion relative to the cage ring axis and forming the connecting arms, each strip portion having a radially directed L-shaped extension constituting the cage arm part, a radial leg in alignment with a part of the strip portion which forms each connecting arm, and a leg extending approximately transversely to the strip portion and provided with the mounting hole and the edge portion constituting the connection means.

3. The planet carrier according to claim 2, wherein the axes of the mounting hole in the central portion and of the mounting hole in the L-shaped extension lie in a plane which lies both parallel to the cage ring axis and at right angles to a straight line forming the geometrical location of the bend edge between the central portion and the strip portion.

4. The planet carrier according to claim 3, wherein the L-shaped extension is formed as a mirror image of a portion of the cage ring about the straight line forming the geometrical location of the bend edge between the central portion and the strip portion, and the edge portion constituting the connection means radially adjoins, in relation to the mirrored cage ring axis, the mirror image extension portion of the cage ring.

5. The planet carrier according to claim 4, wherein the edge portion lies approximately centrally to a mirrored plane which contains the mirror image cage ring axis and the axis of the mounting hole of the extension.

6. The planet carrier according to claim 5, wherein the edge portion is bounded by a cylindrical lateral area concentric to the mirror image cage ring axis.

7. The planet carrier according to claim 6, wherein the edge portion lies, in relation to the mirror image cage ring axis, radially outside the mirror image of the portion of the cage ring.

8. The planet carrier according to claim 6, wherein the edge portion lies in relation to the mirror image cage ring axis radially inside the mirror image portion of the cage ring.

* * * * *